April 6, 1965      R. C. LANGLEY      3,176,678
SOLAR ENERGY COLLECTOR
Filed April 2, 1963
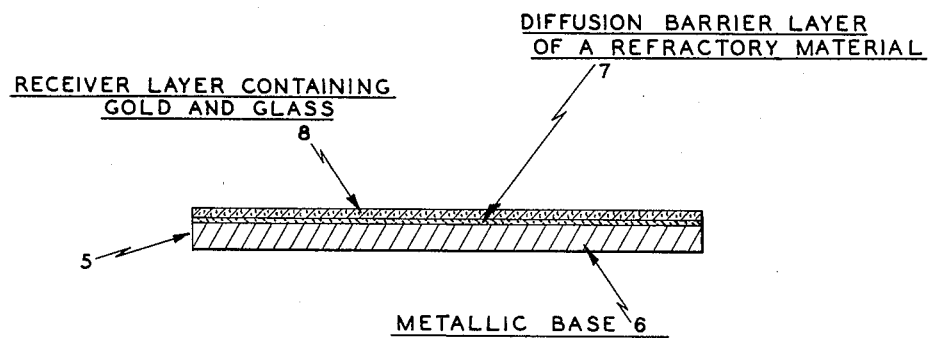
INVENTOR.
ROBERT C. LANGLEY
BY
ATTORNEY United States Patent Office 3,176,678
Patented Apr. 6, 1965

3,176,678
SOLAR ENERGY COLLECTOR
Robert C. Langley, Millington, N.J., assignor to Engelhard Industries, Inc., Newark, N.J., a corporation of Delaware
Filed Apr. 2, 1963, Ser. No. 269,941
10 Claims. (Cl. 126—270)

This invention relates to solar energy collectors, and more especially to solar energy collectors characterized by being well suited for operation at high temperatures, and in a high vacuum such as is encountered in outer space.

The power for the electrical systems in space vehicles is provided by batteries or by silicon solar cells. Batteries have been greatly improved in recent years but have two disadvantages in many space applications; their life is limited and their weight is substantial. Silicon solar cells utilize the photovoltaic effect and draw their energy from an unlimited source, the sun. These cells are inefficient in that they use only about one-third of the solar radiation in a narrow wavelength band. The rest of the solar energy must be reflected to prevent damage to the cells. Because silicon solar cells are unstable at elevated temperatures, optical concentration of solar energy cannot be used to increase output.

In general when radiant energy from the sun impinges on a cooler object, part of the energy is reflected and lost and the balance either absorbed or transmitted. The absorbed energy may be reradiated at a longer wavelength. It is known that black bodies absorb more heat than white ones and become hotter, and that black bodies are also efficient radiators of heat. Black bodies absorb the sun's visible energy and radiate much of it as infrared energy, and hence are inefficient collectors of energy from the sun, i.e. their equilibrium temperature in space is low.

Metals such as silver, copper, gold and aluminum have very low emissivities, especially when highly polished. Low emissivity is necessary if a solar collector is to reach high equilibrium temperature, but silver, copper, gold and aluminum absorb very little solar energy and solar collectors using these metals in the pure state would not have an equilibrium temperature high enough to be useful. Aluminum has a further limitation, a low melting point. Silver and copper are subject to tarnishing which causes emissivity to increase sharply.

The use of glass as a base in solar radiation collectors is not satisfactory for more space applications for the reasons of fragility and relatively low softening temperature. "Pyrex" glass is generally not suitable for use above about 600–650° C. and soft glasses have even lower temperature limits. Glasses of high silica content may be used at materially higher temperatures, but still have the limitation of fragility.

Prior art efforts to increase absorption of solar energy in wavelengths of the sun's radiation spectrum have made use of dark mirrors or anti-reflection films of thickness no greater than one-quarter of the wavelength of the radiation for which reduced reflection is desired. However such dark mirrors and other vacuum-deposited coatings are disadvantageous for the reasons they are thermally unstable at temperatures above 200° C., require application of multiple coats, often many of them, and such multiple coats have relatively low tolerance on thickness of individual coats, and the vacuum deposition limits the use of such coatings to small and simple shapes.

Most of the energy of the sun is emitted at wavelengths below 1.5 microns, with only a minor portion of the sun's radiation being outside the wavelength range of 0.25 micron to 1.5 microns. A surface which absorbs in the range of solar radiation will be heated, provided the surface does not re-radiate or emit all of the energy. The re-radiation of energy from a body at temperatures from 100° C. to 800° C. is largely between 1.5 microns and 20 microns. A desirable surface for the collection of energy from the sun is therefore one having high absorption of solar energy and low reflectance at wavelengths below 1.5 microns, together with low emissivity.

In accordance with the present invention, solar energy collectors are provided which are especially well suited for operation at high temperatures and in a high partial vacuum such as is encountered in outer space. The solar energy collector of this invention comprises a metallic base, a thin solar energy-absorptive receiver layer over the metallic base and exposed to solar radiation, and a thin barrier layer of a refractory material located between the base and the receiver layer, the barrier layer preventing interdiffusion of the gold of the receiver layer and the metal of the base. The receiver layer comprises an intimate fused mixture of gold and a glass, preferably a silicate glass, the glass being obtained by the fusing together of glass-making ingredients formed in situ during the firing and cooling of the fusion melt. The receiver layer is well suited for collecting solar energy by reason of having a good or relatively high absorption, and low reflection of solar energy of wavelengths shorter than 1.5 microns and low emissivity. The receiver layer also has a low transmittance of light. Further the receiver layer and the remainder of the collector is stable at high temperatures for example, above 500° C. and up to 800° C. and higher and under high vacuums, for instance as high as $0.3 \times 10^{-5}$ torr for considerable periods.

Solar radiation impinging on the exposed receiver layer is converted into heat, which is transferred by conduction through the thin diffusion barrier to the metallic base.

The solar energy collector of this invention is well suited for the production of electric current thermo-electrically. When used for this purpose, the collector can be installed as a panel or unit in a space vehicle or rocket, with the receiver layer exposed to solar radiation and with the hot junction of a thermocouple in contact with the metallic base. The collector also has utility for heating water and the generation of steam, and for these uses the water or a metallic conduit or container containing same is in contact with the metallic base of the collector.

The diffusion barrier is essentially a thin layer, as this provides materially better bonding of the receiver layer to the base despite inherent differences between the three layers in expansion and contraction with changes of temperature, and the thin layers do not interfere excessively with the transfer of heat to the metallic base. This barrier layer is preferably of thickness between about 200 and about 1000 Angstrom units, more preferably between about 400 and about 800 Angstrom units in thickness.

The optical properties desired in the receiver layer are dependent on the thickness of the receiver layer, in addition to the material and texture of the receiver layer which is the intimate fused mixture of gold and a glass. For this reason, the receiver layer is a thin layer of a preferred thickness not in excess of about 2000 Angstrom units, more preferably from about 800–1800 Angstrom units.

The receiver layer absorbs typically, depending on wavelength, about 10–85 percent of solar energy of wavelengths in the range of 0.25 to 1.5 microns, reflects typically about 15–90 percent of the solar energy of such wavelengths, and emits typically only about 3–13 percent of the energy absorbed. The receiver has a light transmission of typically less than 1.0%. It is an important feature of the receiver layer that the highest absorption is of energy of wavelengths from about 0.4 to 0.55 micron, since maximum solar radiation is found in this wavelength range.

The preparation method for producing the solar energy collector, in its broader aspects, involves applying a thin layer of a refractory dielectric material onto a metallic base, for instance a base of a nickel-containing alloy such as "Inconel," followed by applying over the diffusion barrier a thin coating of a liquid gold-containing composition comprising a soluble thermally-decomposable organo compound of gold, compatible compounds of fluxing elements at least two of which are glass-making ingredients in their oxide form, an organic solvent for the organo compound of gold, and two or more added compatible compounds of elements which are glass-making ingredients in their oxide form with preferably one of these compounds being a compound of silicon. The gold-containing composition is fired on the diffusion barrier at a temperature sufficiently elevated to decompose the organo compound of gold and convert the compounds of elements which are glass-making ingredients in their oxide form to their corresponding oxides, and the firing is continued at a still higher temperature whereby the glass-making ingredient oxides fuse together. The fired gold-containing composition is then cooled on the diffusion barrier to obtain thereon a thin solar-energy-absorptive receiver layer comprising an intimate fused mixture of gold and a glass.

Temperatures in the range of from about 250–950° C. are employed for firing the applied liquid gold-containing composition. The compounds of the elements which are glass-making ingredients in their oxide form, for instance organo compounds of silicon, barium, bismuth and chromium such as the resinates of these four elements, are converted to their respective oxides, $SiO_2$, $BaO$, $Bi_2O_3$ and $Cr_2O_3$, at temperatures of about 250° C.–350° C., and the organo compound of gold is decomposed and these oxides fused together at higher temperature of about 350° C.–600° C.

The fired receiver film of this invention preferably contains, by weight, from about 80–92 percent of gold, and from about 8–20 percent of total oxides, for instance $Bi_2O_3$, $Cr_2O_3$, $SiO_2$ and $BaO$, these oxides together forming the glass. An especially preferred fired film from the standpoint of the desired optical properties had the following composition:

| | Weight, Percent |
|---|---|
| Au | 89.5 |
| Rh | .4 |
| $Bi_2O_3$ | 4.5 |
| $Cr_2O_3$ | .2 |
| $SiO_2$ | 1.7 |
| $BaO$ | 3.7 |

The liquid gold composition which is applied over the barrier layer to form the receiver layer is preferably a liquid bright gold composition to which have been added compatible compounds of elements which in their oxide form, i.e. as oxides, are glass making ingredients. "Liquid bright gold" is well known in the art as a solution of an organo-gold compound, for instance a gold sulforesinate, in an organic decorating vehicle containing essential oils, and also containing minor amounts of compatible compounds of fluxing elements, for instance of rhodium, bismuth and chromium. A gold mercaptide can be utilized in place of the gold sulforesinate. The liquid bright gold, when applied to a refractory substrate or surface and fired to drive off or burn off the organic material present, results in lustrous thin films. Liquid bright golds are described by Chemnitius, J. Prakt. Chem. 117, 245 (1927) and by Ballard in U.S. Patent 2,490,399.

Liquid bright gold compositions generally contain the organo gold compound in amount equivalent to about 7–20 percent Au by weight, with the compatible compounds of the other fluxing elements or metals, for instance rhodium, chromium and bismuth, normally contained therein being present in relatively minor quantities. The organo compound of the rhodium is usually present therein in amount equivalent to about .03–0.10 percent Rh by weight, the organo compound of chromium in amount equivalent to about .02–.06 percent $Cr_2O_3$, and the organo compound of the bismuth in amount equivalent to about .10–.50 percent $Bi_2O_3$, with the remainder being the vehicle. Organo compounds of nickel and cobalt can replace the compounds of chromium and bismuth as fluxing elements in the formulation if desired. This liquid bright gold is preferably admixed with the compatible compounds of silicon and the basic metal, such as silicon resinate and barium resinate respectively in the proportions, by weight, of from about 93–97 percent of the liquid bright gold composition, from about 0.5–2.0 percent of the silicon compound calculated as $SiO_2$, and from about 2.5–5.0 percent of the basic metal compound calculated as the oxide. In place of the soluble organo compounds of the rhodium, chromium, bismuth or other fluxing elements in the liquid bright gold, compatible inorganic compounds can be used including rhodium chloride, chromium chloride and bismuth trichloride or bismuth nitrate. In place of the soluble organo compounds of the silicon and barium, other compatible compounds of these elements could be added, for instance tetrabenzylsilicane and barium acetate.

The barrier layer, which is applied over the metallic base prior to application of the receiver layer, is essential for preventing interdiffusion of the gold and the metallic base. In the absence of such diffusion barrier, the gold of the receiver layer will interdiffuse with the metallic base to the extent of actual disappearance of the gold. The material of the diffusion barrier layer is a refractory material, and exemplary of such materials are refractory oxides, for instance cerium oxide, aluminum oxide, nickel oxide and porcelain enamel frits.

The material of the diffusion barrier is preferably a dielectric material, i.e. a material non-conductive to electricity or having an electrical resistivty of at least 50,000 ohms. The reason for this is that metals do not diffuse in dielectric solids or do so at rates materially lower than diffusion rates of metals in non-dielectric materials.

The cerium oxide can be applied onto the metallic base by vacuum deposition, the aluminum oxide by flame spraying, and the nickel oxide by electroplating followed by heating the nickel-plated base in air. These application methods are conventional and well known. A preferred way of applying the aluminum oxide, cerium oxide or nickel oxide is to make solutions of an organo compound of the aluminum, cerium or nickel in an organic solvent, then spray the solution over the metallic base as a thin layer, followed by firing the sprayed-on layer in air at temperature of about 300–800° C. to drive off the organic matter and deposit the cerium oxide, aluminum oxide, or nickel oxide. This spray-on method is preferred as thinner barrier films are attained, which is preferred for the reasons previously disclosed. The porcelain enamel frits are applied by spraying the enamel frits suspended in a liquid vehicle onto the metallic base, followed by firing the applied enamel frits. This is a conventional application method. Alternatively, the porcelain enamel frits can be applied by the dry powder method without a vehicle, wherein the dry powdered porcelain enamel is sifted onto the metallic base, and then fired. The use of the porcelain enamel frits for the barrier layer is less preferred as it is difficult to obtain the thinness desired with the frits.

The metals of the metallic base are those stable at the operating conditions of the solar collector, which may include high temperature up to 800° C. and higher, and a high vacuum such as found in outer space. Exemplary of such metals are a nickel alloy marketed under the trademark name "Inconel," nickel per se, stainless steel, platinum and palladium. These metals have good strength and good resistance to corrosion and tarnishing at the high temperatures and under high vacuums.

The glass of the receiver layer is essential therein together with the gold, inasmuch as without the glass the desired optical properties of the receiver layer are not present. The fused mixture of the receiver layer has the glass uniformly or substantially uniformly distributed throughout the gold. While not absolutely certain, it appears the glass is primarily responsible for the relatively high absorption of the solar energy of wavelengths shorter than 1.5 microns; while the gold is primarily responsible for the low emissivity of the film. The gold is usually present therein in fluxed state and alloyed with the rhodium or other flux.

Preferably the glass-making ingredients which fuse together to form the glass of the receiver layer include silica, and an especially preferred liquid gold composition includes, in addition to the silica, barium oxide, both of which are ingredients normally not present in a liquid bright gold, and also chromic oxide and bismuth trioxide, ingredients normally present in a liquid bright gold. These four ingredients are initially present in the liquid bright gold as compatible compounds, preferably as organo compounds, for instance resinates, and are converted to the oxides specified during the firing. These oxides fuse together and form the glass after cooling. Less preferably, instead of the barium oxide, one or more other glass-making ingredients can be substituted. Exemplary of these other glass-making ingredients are the basic metal oxides, calcium oxide, magnesium oxide, beryllium oxide, lithium oxide and strontium oxide. In place of the silica, germanium oxide can be utilized as the glass-making ingredient. These glass-making ingredients disclosed above, which are also normally not ingredients of the liquid bright gold composition, are added as compatible compounds, preferably as organo compounds of the particular elements, e.g. as resinates thereof. These resinates as well as the resinates of the silicon, barium and of the fluxing elements normally present in the liquid bright gold are prepared by reacting inorganic compounds containing these elements with an organic material such as rosin. The preparation of the resinates is more fully described in U.S. Patent 2,842,457.

The fused mixture of the gold and glass of the receiver layer not only achieves the optical properties of the desired absorption and reflectance, but this combination is also stable at elevated temperatures up to 800° C. and higher, and in high vacuums.

Examples of liquid gold compositions found to be well suited for application over the barrier layer with subsequent firing to form the receiver layer are hereinafter set forth. Both compositions contain silicon resinate and barium resinate, organo compounds normally not present in a liquid bright gold composition and added here as special ingredients.

LIQUID GOLD COMPOSITION A

| | Parts by weight |
|---|---|
| Gold sulforesinate dissolved in a mixture of oil of rosemary, nitrobenzene and toluene (25% Au) | 13.49 |
| Rhodium sulforesinate dissolved in a mixture of oil of rosemary, nitrobenzene and toluene (1% Rh) | 1.45 |
| Bismuth resinate dissolved in a mixture of essential oils (5% $Bi_2O_3$) | 3.23 |
| Chromium resinate dissolved in a mixture of cyclohexanone and oil of turpentine (3% $Cr_2O_3$) | .25 |
| Silicon resinate dissolved in a mixture of essential oils (20% $SiO_2$) | .31 |
| Barium resinate dissolved in a mixture of essential oils (13% BaO) | 1.04 |
| Asphalt dissolved in oil of turpentine (30% asphalt) | 1.3 |
| Rosin dissolved in oil of turpentine (50% rosin) | 1.3 |
| Hexalin | 1.77 |
| Toluene | .43 |
| Ethyl acetate | .43 |
| | 25.00 |

LIQUID GOLD COMPOSITION B

| | Parts by weight |
|---|---|
| Gold sulforesinate dissolved in a mixture of oil of rosemary, nitrobenzene and toluene (24% Au) | 8.99 |
| Rhodium sulforesinate dissolved in a mixture of oil of rosemary, nitrobenzene and toluene (1% Rh) | .97 |
| Bismuth resinate dissolved in a mixture of essential oils (5% $Bi_2O_3$) | 2.15 |
| Chromium resinate dissolved in a mixture of cyclohexanone and oil of turpentine (3% $Cr_2O_3$) | .165 |
| Silicon resinate dissolved in a mixture of essential oils (20% $SiO_2$) | .209 |
| Barium resinate dissolved in a mixture of essential oils (13% BaO) | .692 |
| Asphalt dissolved in oil of turpentine (30% asphalt) | 2.95 |
| Rosin dissolved in oil of turpentine (50% rosin) | 2.95 |
| Hexalin | 3.924 |
| Toluene | 1.0 |
| Ethyl acetate | 1.0 |
| | 25.000 |

By the term "glass" as a constituent of the receiver film as used herein is meant a fused, non crystalline mass composed of silica or germanium oxide and other of the oxides disclosed herein and formed in situ during the firing. The term "silicate glass" means a glass as defined above with silica as one of the glass-forming ingredients. By the term "glass-forming ingredients" is meant the silica or germanium oxide and the other oxides formed in situ during the firing which fuse together and form the glass after cooling. The term "basic metal oxides" designates metal oxides capable of combining with silica or germanium oxide to form a glass.

To determine whether experimental glass-containing gold films will function as solar collecting surfaces, it is convenient to measure reflectance over the range of 0.4 to 15.0 microns. Since transmittance of these films is very low, about 1.0% at any wavelength, the difference between the measured reflectance and 100% is a close approximation of the amount of energy absorbed at a particular wavelength. Since 90% of the sun's energy is given off at wavelengths of 0.4 to 1.5 microns, a glass-containing gold film must reflect little energy, i.e. absorb well in this range. To determine whether such a film also has the low emissivity inherent in pure gold, reflectance over the range of 1.5 to 15.0 microns is measured. If reflectance values in this range are high, emissivity is necessarily low since the two properties are mutually exclusive.

Tests were carried out for the desired optical properties of absorption and reflectance on numerous films obtained by firing organic solutions of single elements which can be used as additives to organic precious metal solutions. These elements were made soluble in organic solvents by first making the proper carboxylate, alcoholate or mercaptide in known manner. The starting acid, alcohol or mercaptan was chosen to give high solubility of the element, low volatility, complete decomposition of the organic upon heating, and compatability with solutions of other metals.

Solutions of the following single elements were formulated and the films formed from them were tested.

| | |
|---|---|
| Gold | Cadmium |
| Silver | Tin |
| Platinum | Antimony |
| Palladium | Barium |
| Rhodium | Gallium |
| Ruthenium | Neodymium |
| Iridium | Praseodymium |
| Boron | Niobium |
| Cobalt | Cerium |
| Silicon | Lead |
| Calcium | Bismuth |
| Vanadium | Titanium |
| Aluminum | Lanthanum |
| Lithium | Magnesium |
| Potassium | Tungsten |
| Yttrium | Germanium |
| Chromium | Copper |
| Manganese | Rhenium |
| Iron | Uranium |
| Nickel | Molybdenum |
| Zinc | Indium |
| Tantalum | Phosphorus |
| Strontium | Sodium |
| Zirconium | |

This formulating involved dilution with aromatic solvents and essential oils and the addition of solutions of asphalt, rosin and sulfurized rosin. Two inch squares of soda-lime glass one-sixteenth inch thick were washed with a detergent solution in a household type dishwashing machine. The glass was allowed to dry in the machine and was not handled on the surface to be decorated. The glass was placed flat in a spinning machine in a dust-free cabinet in which a positive pressure was maintained by forcing in air through a filter, and the glass dusted lightly with a camel's hair brush. The solution to be applied was dropped on to the approximate center of the glass while it was spinning at 1550 r.p.m. It was necessary only to observe that an excess of solution was flung from the edges. The glass was removed from the spinning device and kept in the dust-free cabinet to prevent airborne dust from marring the still tacky film. When a number of samples had been coated, they were carried, under cover, to an electrically heated continuous lehr, and placed on flat refractory supports and fired in air to a peak temperature of 600° C. The total lehr cycle was 1.5 hours with the glass maintained at peak temperature for 10 minutes.

Under the firing conditions used in the tests, all of the elements which form oxides formed their highest stable oxides. In the case of gold and platinum, specular films developed at 300° C. to 400° C. but failed between this temperature and 600° C. This failure took the form of loss of mirror and loss of electrical conductivity. Under magnification the formerly smooth films had broken down to discrete areas of metal, and became highly transparent. Of the 47 solutions, only the films formed from cobalt, manganese, iron, copper, uranium and palladium showed enough of an increase in absorption at and below 1.5 microns, as evidenced by a decrease in transmission at 1.5 microns measured on a Beckman DU instrument, to warrant reflection measurements. The remaining 40 films including the films of gold and of platinum failed to exhibit the desired absorption at and below 1.5 microns. However the films formed from the cobalt, manganese, iron, copper, uranium and palladium did not show the desired good reflectance above 1.5 microns but instead a decreasing reflectance for the most part as evidenced by the following Table I:

*Table I*

Specular reflection in terms of a plane, polished aluminum mirror.

| Wavelength in microns | Percent Reflection | | | | | |
|---|---|---|---|---|---|---|
| | Co | Mn | Fe | Cu | U | Pd |
| 0.4 | 12 | 12 | 14 | 12 | 14 | 17 |
| 0.5 | 9 | 10 | 13 | 5 | 11 | 20 |
| 0.6 | 8 | 11 | 16 | 3 | 6 | 25 |
| 0.8 | 12 | 9 | 6 | 3 | 6 | 25 |
| 1.0 | 6 | 11 | 11 | 6 | 8 | 25 |
| 1.2 | 9 | 14 | 14 | 9 | 10 | 19 |
| 1.4 | 16 | 16 | 17 | 9 | 10 | 15 |
| 1.6 | 22 | 17 | 17 | 9 | 10 | 13 |
| 1.8 | 22 | 15 | 17 | 9 | 10 | 11 |
| 2.0 | 21 | 14 | 16 | 9 | 10 | 10 |
| 2.2 | 20 | 13 | 15 | 8 | 9 | 10 |
| 2.4 | 19 | 12 | 15 | 8 | 7 | 9 |
| 2.6 | 19 | 11 | 15 | 8 | 7 | 8 |
| 2.8 | 17 | 9 | 12 | 7 | 6 | 6 |
| 3.0 | 12 | 8 | 10 | 5 | 4 | 5 |
| 3.2 | 14 | 7 | 10 | 5 | 4 | 5 |
| 3.4 | 14 | 7 | 11 | 5 | 3 | 5 |
| 3.6 | 7 | 7 | 9 | 6 | 3 | 4 |
| 3.8 | 12 | 6 | 9 | 5 | 3 | 6 |
| 4.0 | 10 | 5 | 7 | 6 | 1 | 5 |

The accompanying drawing is a schematic cross-sectional view of a solar energy collector of this invention.

In the drawing, solar energy collector 5 has metallic base 6, which is a panel or sheet of the nickel alloy "Inconel" of typical dimensions of thickness 1/16 inch, length of 2 inches and width of 2 inches. Barirer layer 7 of a refractory dielectric material such as cerium oxide is superposed over and bonded to base 6. Barrier layer 7 has length and width similar to that of base 6 and a thickness of typically 1000 Angstrom units as not to prevent good heat transfer from the receiver layer to the metallic base. Receiver layer 8 superposed over barrier layer 7 and bonded thereto, comprises a continuous layer of an intimate fused homogeneous mixture of metallic gold and a silicate glass, with the glass uniformly distributed or homogeneously mixed in the gold. Receiver layer 8 has a uniform yellow color throughout its extent imparted by the gold. The silicate glass is formed from glass-making oxides formed in situ during the firing as previously disclosed. Receiver layer 8 is a thin layer of thickness of 1800 Angstrom units and length and width similar to that of barrier layer 7. The three layers adhere well to one another by strong bonds to form an integral composite or unit. When the solar energy collector 5 is used for production of electric current thermo-electrically, for instance in a space vehicle or rocket, the hot junction of a thermocouple will be in contact with the metallic base 6. Suitable thermocouples for such thermoelectric operation include for example couples with the two legs having slightly varied bismuth telluride compositions, and couples with the two legs having slightly varied lead telluride compositions.

The following data in Table II shows the optical properties in the wavelength range of interest provided by films on glass slides obtained by applying thereon and firing the Liquid Gold Composition A previously disclosed. The film had thickness of about 1800 Angstrom units.

Table II

Specular reflection in terms of a plane, polished aluminum mirror.

| Wavelength in microns | Percent Reflected | Percent Absorbed |
|---|---|---|
| 0.4 | 55.6 | 44.4 |
| 0.5 | 29.4 | 70.4 |
| 0.6 | 47.5 | 52.5 |
| 0.8 | 49.2 | 50.8 |
| 1.0 | 63.3 | 36.7 |
| 1.2 | 74.7 | 25.3 |
| 1.4 | 86.0 | 14.0 |
| 1.6 | 88.5 | |
| 1.8 | 89.2 | |
| 2.0 | 91.8 | |
| 2.2 | 93.5 | |
| 2.4 | 93.8 | |
| 2.6 | 97.0 | |
| 2.8 | 90.0 | |
| 3.0 | 93.0 | |
| 3.2 | 94.5 | |
| 3.4 | 90.8 | |
| 3.6 | 95.6 | |
| 3.8 | 93.5 | |
| 4.0 | 97.2 | |
| 5.0 | 98 | |
| 6.0 | 99 | |
| 8.0 | 99 | |
| 10.0 | 98 | |
| 12.0 | 98 | |
| 14.0 | 99 | |
| 15.0 | 99 | |
|  | 100 | |

The data of Table II shows that the film for the most part had higher absorption of energy of wavelengths below 1.5 and that the film absorbed heavily at the wavelength of 0.5 micron, which is the wavelength of maximum solar radiation. The Table II data also shows that the film for the most part had the desired higher reflectance of wavelengths longer than 1.5 microns than those of length shorter than this figure.

The optical properties in the wavelength range of interest exhibited by films obtained by applying onto glass slides and firing the Liquid Gold Composition B previously disclosed herein, is shown in Table III below: This film had a thickness of about 1250 Angstrom units.

Table III

Specular reflection in terms of a plane, polished aluminum mirror.

| Wavelength in microns | Percent Reflected | Percent Absorbed |
|---|---|---|
| 0.4 | 57.0 | 43 |
| 0.5 | 31.0 | 69 |
| 0.6 | 33.7 | 66.3 |
| 0.8 | 52.2 | 46.8 |
| 1.0 | 61.2 | 38.8 |
| 1.2 | 72.7 | 27.3 |
| 1.4 | 82.0 | 18.0 |
| 1.6 | 96.0 | |
| 1.8 | 96.7 | |
| 2.0 | 96.6 | |
| 2.2 | 95.5 | |
| 2.4 | 95.0 | |
| 2.6 | 97.8 | |
| 2.8 | 94.5 | |
| 3.0 | 81.7 | |
| 3.2 | 81.0 | |
| 3.4 | 91.8 | |
| 3.6 | 91.6 | |
| 3.8 | 87.2 | |
| 4.0 | 84.2 | |
| 5.0 | 99 | |
| 6.0 | 100 | |
| 8.0 | 102 | |
| 10.0 | 102 | |
| 12.0 | 103 | |
| 14.0 | 103 | |
| 15.0 | 103 | |

The Table III data shows that the film had higher absorption of energy wavelengths below 1.5 microns than of wavelengths above this figure, and that the film absorbed heavily at a wavelength of 0.5 micron, the wavelength of maximum solar radiation. The Table II data also shows that the film had the desired higher reflectance at wavelengths above 1.5 than at below this figure.

The following examples further illustrate the invention:

EXAMPLE I

A two by two inch flat piece of "Inconel," one-sixteenth inch thick, was ground until one surface had a roughness of 5 microinches. Cerium oxide was vacuum deposited on the ground surface in an amount averaging 5.2 milligrams per square centimeter. Liquid Gold Composition B was brushed over the cerium oxide in a medium application using a small camel's hair brush. Care was taken that the gold solution did not contact the exposed edges of the "Inconel" substrate. The gold film was fired in air gradually to 600° C., maintained at this temperature for 10 minutes, and cooled gradually to room temperature. This was done in an electrically heated continuous lehr on a total cycle time of 1.5 hours. Reflectance of the glass containing gold film was measured in terms of magnesium oxide using a General Electric recording spectrophotometer. The sample was then heated at 700° C. in a vacuum of $0.3 \times 10^{-5}$ torr for 50 hours and measured again. There was essentially no change in reflectance values over the range where solar radiation is a maximum.

| Wave Length (microns) | After Firing in Air | After 700° C. in Vacuum |
|---|---|---|
| .430 | 17.5 | 17.5 |
| .500 | 18.0 | 19.0 |
| .550 | 31.0 | 33.0 |
| .600 | 37.5 | 41.0 |
| .650 | 41.0 | 46.0 |
| .700 | 44.0 | 50.0 |
| .750 | 48.0 | 53.0 |
| .800 | 52.0 | 56.0 |
| .850 | 54.0 | 58.0 |
| .900 | 57.0 | 60.0 |
| .950 | 60.0 | 61.0 |
| 1.000 | 62.5 | 63.5 |

EXAMPLE II

Example I was repeated except that cerium oxide was applied in a novel manner which proved to be much simpler than the vacuum technique. This was accomplished using the following organic solution of cerium.

| | |
|---|---|
| Cerium resinate dissolved in a mixture of oil of rosemary, nitrobenzene and toluene (5% $CeO_2$) | 36.0 |
| Rosin dissolved in oil of turpentine (50% rosin) | 27.0 |
| Oil of rosemary | 9.0 |
| Hexalin | 9.0 |
| Toluene | 9.0 |
| | 90.0 |

The resulting clear brown solution contained 2.0% cerium calculated as $CeO_2$. It was applied to the ground "Inconel" substrate by spraying using a small airbrush and approximately 20 pounds air pressure. The organic coating was then converted to a thin, adherent, iridescent film of cerium oxide by firing on the cycle described in Example I above. Six very thin coats were applied in this way to give a total cerium oxide diffusion barrier thickness of approximately 800 Angstroms. Gold Composition B was then applied and fired as described above and the completed solar collector was measured, subjected to 700° C. for 50 hours in a vacuum of $0.3 \times 10^{-5}$ torr and measured again. The solar collecting efficiency of the composite actually improved slightly after the high temperature, high vacuum cycle as evidenced by the following reflectance values.

| Wave Length (microns) | After Firing in Air | After 700° C. in Vacuum |
|---|---|---|
| .430 | 19.0 | 7.0 |
| .500 | 20.0 | 11.0 |
| .550 | 32.0 | 20.0 |
| .600 | 38.5 | 30.0 |
| .650 | 43.0 | 38.5 |
| .700 | 45.0 | 45.0 |
| .750 | 47.5 | 50.0 |
| .800 | 49.0 | 53.0 |
| .850 | 52.0 | 56.0 |
| .900 | 54.0 | 58.5 |
| .950 | 56.5 | 60.0 |
| 1.000 | 59.0 | 61.5 |

EXAMPLE III

Example II was repeated except that two coats of the organic solution of cerium were used in place of the six described in Example II. This gave a diffusion barrier thickness of about 300 Angstroms. It was found that a solar collector made in this way had good stability at 600° C. for 50 hours in a vacuum of $0.3 \times 10^{-5}$. Essentially no change in reflectance values was found after this cycle. This thinner diffusion barrier did not prevent a marked change in reflectance of the glass-containing gold film when heated at 700° C. for 50 hours under the same vacuum conditions. These tests indicate that extremely thin cerium oxide diffusion barriers applied from organic solution are effective at 600° C. for prolonged periods of time and that slightly more substantial cerium oxide films are effective at 700° C. for prolonged periods of time. Because of ease of application of such organic solutions, an appropriate number of coats can be applied to suit particular operating conditions.

EXAMPLE IV

To obtain very thin aluminum oxide diffusion barriers, the following solution was made:

| | |
|---|---|
| Aluminum resinate dissolved in a mixture of oil of rosemary, nitrobenzene and toluene (5% $Al_2O_3$) | 33.3 |
| Rosin dissolved in oil of turpentine (50% rosin) | 33.3 |
| Oil of rosemary | 11.1 |
| Hexalin | 11.1 |
| Toluene | 11.2 |
| | 100.0 |

The dark brown, fluid solution resulting after mixing contained 1.67% aluminum calculated as $Al_2O_3$. Experimentation with two, four and six coats of this aluminum organic solution, applied and fired substantially identically as in Example II, showed that aluminum oxide diffusion barriers of about 300 Angstroms thickness, effectively prevented change in the reflectance properties of a glass-containing gold solar collector at temperature of 600° C. for 50 hours in high vacuum. Somewhat thicker aluminum oxide diffusion barriers were needed to prevent marked change in optical properties of the solar collector at 800° C. for 50 hours in high vacuum. In this case, it was found that four and six coats of the above organic solution of aluminum were effective. These applications gave diffusion barrier film thicknesses of about 500 to 800 Angstroms.

EXAMPLE V

A solar collector is made by electroplating nickel on to a platinum foil 4 mils thick. Nickel is applied to a thickness of 0.001 inch and is subsequently fully converted to nickel oxide by heating in air at 800° C. for 48 hours. A medium application of Gold Composition A is brushed over the nickel oxide. After firing in air this gives a glass-containing gold film about 1800 Angstroms thick. The resulting composite is suitable for continuous operation at 700° C.

EXAMPLE VI

A solar collector using a porcelain enamel frit as diffusion barrier was made as follows. Honed "Inconel" having a surface finish of 2 microinches was sprayed with a water suspension of porcelain enamel frit which was a National Bureau of Standards Frit No. A418. The frit was fused to the "Inconel" by firing at 1010° C. for 3 minutes. Two thin applications and two firings were used to obtain a total frit thickness of about 0.002 inch. Gold Composition B was rushed on in medium deposit and fired gradually in air to 600° C. with a 10 minute soak at this temperature. A specular, adherent glass-containing gold film resulted. This solar collector did not change in reflectance properties after 50 hours at 600° C. in a vacuum of $0.3 \times 10^{-5}$ torr.

EXAMPLE VII

A solar collector is made as in Example VI with the exception that stainless steel is used in place of "Inconel" for the substrate. In this case, frit A418 is fired at 900° C. for 3 minutes. The resulting composite is suitable for continuous operation at 700° C.

It will be obvious to those skilled in the art that many modifications may be made within the scope of the present invention without departing from the spirit thereof, and the invention includes all such modifications.

What is claimed is:

1. A solar energy collector comprising a metallic base, a thin solar energy-absorptive receiver layer over the metallic base and exposed to solar radiation, the receiver layer comprising an intimate fused mixture of gold and a glass, and a thin barrier layer of a refractory material intermediate the base and the receiver layer, the barrier layer preventing interdiffusion of the gold and the metal of the base.

2. The solar energy collector of claim 1 wherein the glass is a silicate glass obtained by the fusing together of glass-making ingredients formed in situ including silica, and cooling of the fusion melt.

3. A solar energy collector comprising a metallic base, a thin solar energy-absorptive receiver layer over the metallic base and exposed to solar radiation, the receiver layer comprising an intimate fused mixture of gold and a silicate glass with the glass distributed substantially uniformly throughout the gold, said receiver layer characterized by having a higher absorption and a lower reflectance of solar energy of wavelengths shorter than 1.5 microns, and a thin barrier layer of a refractory dielectric material intermediate the base and the receiver layer, the barrier layer preventing interdiffusion of the gold and the metal of the base.

4. The solar energy collector of claim 3 wherein the glass is a silicate glass obtained by the fusing together of glass-making ingredients formed in situ including silica and barium oxide, and cooling of the fusion melt.

5. The solar energy collector of claim 3 wherein the silicate glass is obtained by the fusing together of glass-making ingredients formed in situ during firing including silica, barium oxide, bismuth trioxde and chromic oxide, and cooling of the fusion melt.

6. The solar energy collector of claim 3 wherein the receiver layer contains, by weight, from about 80-92 percent of gold and from about 8-20 percent of the silicate glass.

7. The solar energy collector of claim 3 wherein the thin barrier layer has thickness of between about 200 and about 1000 Angstrom units.

8. The solar energy collector of claim 3 wherein the receiver layer has thickness of not in excess of about 2000 Angstrom units.

9. The solar energy collector of claim 3 wherein the thin barrier layer consists of cerium oxide.

10. The solar energy collector of claim 3 wherein the thin barrier layer consists of aluminum oxide.

References Cited by the Examiner

UNITED STATES PATENTS

| 2,917,817 | 12/59 | Tabor | 126—270 XR |
| 3,000,375 | 9/61 | Golay | 126—270 |
| 3,018,191 | 1/62 | Caban et al. | 117—71 XR |
| 3,043,112 | 7/62 | Head | 126—270 XR |
| 3,118,781 | 1/64 | Downing | 117—71 XR |

FOREIGN PATENTS

| 209,014 | 4/57 | Australia. |

JAMES W. WESTHAVER, *Primary Examiner.*

PERCY L. PATRICK, *Examiner.*

UNITED STATES PATENT OFFICE
CERTIFICATE OF CORRECTION

Patent No. 3,176,678                        April 6, 1965

Robert C. Langley

It is hereby certified that error appears in the above numbered patent requiring correction and that the said Letters Patent should read as corrected below.

Column 4, line 55, for "resistivty" read -- resistivity --; column 6, line 4, for "25%" read -- 24% --; column 7, line 54, for "abserve" read -- observe --; column 8, line 42, after "thickness" insert -- of --; line 43, for "Barirer" read -- Barrier --; column 11, line 70, for "rushed" read -- brushed --; column 12, line 44, for "trioxde" read -- trioxide --.

Signed and sealed this 24th day of August 1965.

(SEAL)
Attest:

ERNEST W. SWIDER                         EDWARD J. BRENNER
Attesting Officer                          Commissioner of Patents